United States Patent

Lieberman

[11] 4,032,753
[45] June 28, 1977

[54] PROGRAMMING APPARATUS

[76] Inventor: Stanley J. Lieberman, 1560 Glencoe Road, Winter Park, Fla. 32789

[22] Filed: Apr. 19, 1976

[21] Appl. No.: 678,182

[52] U.S. Cl. .................. 235/61.6 M; 235/61.11 B; 235/61.12 N
[51] Int. Cl.² .................. G06K 15/18; G06K 7/04; G06K 19/06
[58] Field of Search .............. 235/61.12 N, 61.6 M, 235/145, 146, 61.11 B; 197/19, 20

[56] References Cited

UNITED STATES PATENTS

| | | | |
|---|---|---|---|
| 2,273,740 | 2/1942 | Terry | 235/61.12 N |
| 2,521,338 | 9/1950 | Bryce et al. | 235/61.12 N |
| 3,624,772 | 11/1971 | Grunwald | 235/61.12 N |
| 3,916,159 | 10/1975 | Del Castillo | 235/61.12 N |

*Primary Examiner*—Daryl W. Cook

*Attorney, Agent, or Firm*—Duckworth, Hobby, Orman, Allen & Pettis, P.A.

[57] ABSTRACT

An apparatus for programming a hand-held programmable electronic calculator of the type having depressible key inputs. The apparatus includes a program tape having a plurality of apertures therein forming a matrix defined by a plurality of rows and columns. Command pins are inserted within selected ones of the apertures for representing programming commands. A frame is included for receiving the calculator and for providing registration between the aperture matrix of the program tape and the depressible keys of the calculator. A plurality of levers are coupled to the frame for being actuated by the command pins to depress the calculator keys. A rotatable cam is included for engaging the command pin in each row of the program tape, and sequentially moving the command pins and the program tape through communication with the levers, thereby sequentially actuating the depressible keys for programming the calculator.

12 Claims, 6 Drawing Figures

PROGRAMMING APPARATUS

BACKGROUND OF THE INVENTION

1. Field of the Invention

This invention relates to a mechanical apparatus for manually programming calculators and business machines having depressible key or button inputs.

2. Description of the Prior Art

Rapid technical advances in the production of large scale integrated (LSI) circuits have made possible the introduction of many different models of hand-held, programmable electronic calculators. Some of these models employ magnetic cards for loading a series of program steps into the calculator, while other calculators must be manually loaded each time a new program is chosen. The present programming apparatus is directed toward the manually programmable electronic calculators and provides a rapid and accurate method of easily loading a series of program steps into the manually operated hand-held electronic calculator.

The manually operated programming apparatus is preferable in several important respects to its electronic equivalent. First, a single step within the program may easily be revised in the mechanical storage configuration without repeating the loading operations of the entire program as is required on the electronically programmed calculators. Secondly, a single manual programming apparatus may be utilized to load programs into several different electronic calculators of the same type, thus alleviating the requirement for each of the electronic calculators to have separate loading and recording capabilities. Third, a manual programming apparatus can be designed for each programmable electronic calculator, regardless of the manufacture, that utilizes depressible keys or buttons to insert the program. Thus, any keyboard and calculator case configuration can be accomodated by this invention. The programming card for the mechanical configuration may be altered to reflect different keyboard nomenclature for several different models of manually programmable calculators. Fourth, the programming card utilized by the manual programming apparatus is resistant to the effects of intense electrical or magnetic radiation which may cause the erasure of conventional magnetic storage mediums utilized in the electronically programmable hand calculators.

Edminister et al in U.S. Pat. No. 2,800,539 disclose a programming apparatus to be used in conjunction with a business machine having a movable carriage for operating electrical switches in response to the position of the carriage. This programming apparatus utilizes a punched paper tape to store the program. Godlove et al in U.S. Pat. No. 3,230,357 disclose a programming apparatus for sequentially filling information into a digital differential analyzer. Di Cambio in U.S. Pat. No. 2,792,991 discloses a programming apparatus for skipping, at high speeds, program steps in an electronic commutator-type program control unit.

SUMMARY OF THE INVENTION

This invention relates to an apparatus for programming electronic calculators of the type having depressible key inputs. The programming apparatus comprises tape storage means having a matrix of rows and columns thereon, and command means for coupling to said tape storage means for storing a particular programming command thereon. Actuator means are coupled between the tape storage means and the depressible keys of the calculator for actuating the depressible keys responsive to the command means. A frame is included for receiving therein the calculator and for providing registration between the tape storage means, the command means, the actuator means and the depressible keys. Motive means are coupled to the frame for moving the command means, having the tape storage means coupled thereto, relative to the actuator means for sequentially actuating the depressible keys, whereby the hand-held electronic calculator is programmed.

THE DRAWINGS

Other objects, features and advantages of the present invention will be obvious from a study of the written description and the drawings in which.

DETAILED DESCRIPTION OF THE PREFERRED EMBODIMENT

Figure 1:
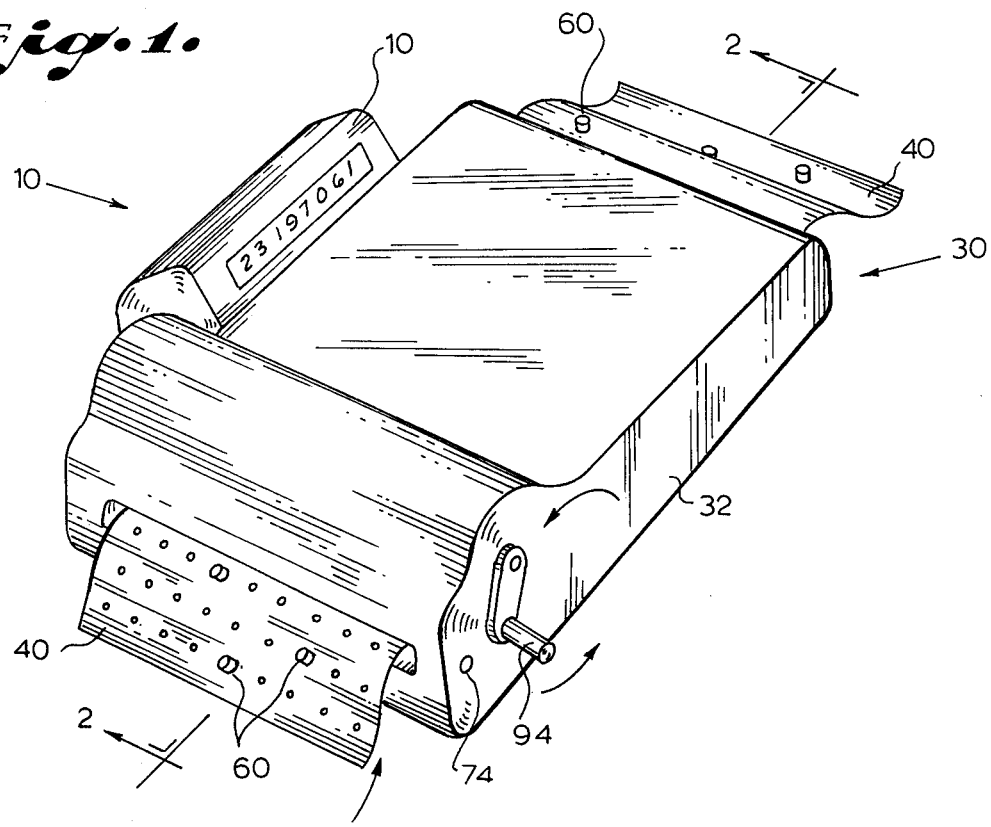
FIG. 1 is a perspective view of the programming apparatus.

An apparatus in accordance with the present invention for programming a hand-held electronic calculator 10 is shown generally as 30 in FIG. 1. The programming apparatus 30 includes a frame 32 having a generally rectangular cavity 34 therein for coupling with a hand-held, programmable electronic calculator shown as 10. A bottom surface 36 defining the rectangular cavity 34 within the frame 32 is designed to congruently couple with a formed bottom section 12 of the electronic calculator 10 for providing a known registration between the frame 32 and a plurality of depressible key inputs, shown generally as 16a-dd in FIG. 3, to the programmable calculator 10.

Tape storage means are included for organizing and storing the programming steps to be loaded into the calculator 10. With reference to FIGS. 1, 2, 4, 5, and 6, a preferred embodiment of the tape storage means comprises a flexible program card 40 having a plurality of apertures 42 therein. The apertures 42 are arranged in a matrix defined by a plurality of rows 44 and columns 46. Each row 44 on the flexible program card 40 contains therein a number of apertures 42 corresponding to the number of depressible keys 16a–dd of the calculator 10. Therefore, each of the apertures 42 in the sequence of rows 44 defines a plurality of columns 46, with each of the columns representing one of the keys 16a–16dd of the calculator 10. Thus, each of the rows 44 represents one step in the calculator program, while each of the columns 46 represents one of the keys 16a–dd of the calculator 10 which may be actuated at a particular step of the program. The flexible program card 40 may have printed thereon the step number of the program, which would also correspond to the number of the row 44, and the functions of the keys 16a–dd which would also correspond to the functional operation represented by each of the columns 46.

Figure 4:
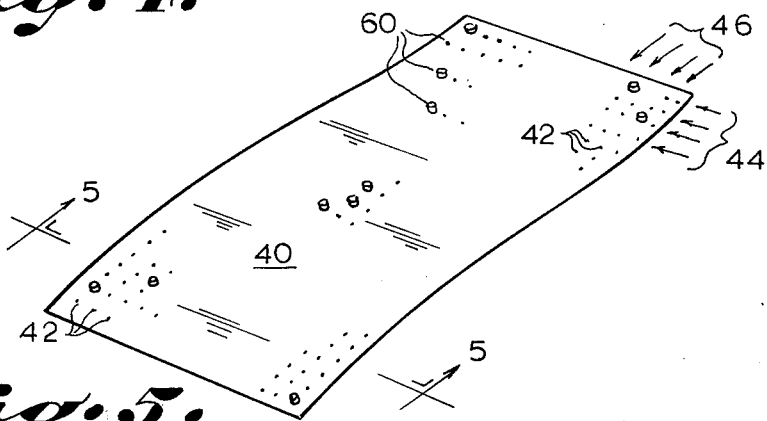
FIG. 4 is a perspective view of the programming tape having the command pins coupled thereto.
Figure 5:
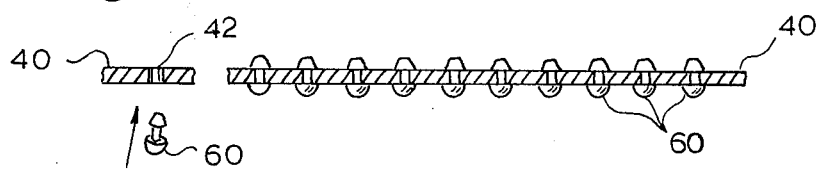
FIG. 5 is an end cross-sectional view taken along section lines 5—5 as shown in FIG. 6.
Figure 6:
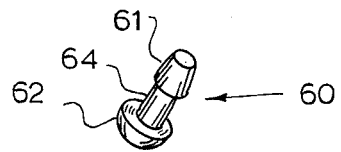
FIG. 6 is a perspective view of a single command pin.

Command means are provided for coupling through the apertures 42 in the flexible program card 40 for storing therein or representing a particular programming command. In the first preferred embodiment as illustrated in FIGS. 4, 5, and 6, the command means comprises a plurality of command pins 60 removably coupled through one of the apertures 42 in the flexible program card 40. Each of the command pins 60 is formed from a generally cylindrical shaft having a tapered first end 61 and an enlarged head section on the second end 62 thereof. A shaft section of reduced diameter 64 (or recessed section) is located intermediate the first end 61 and the second end 62 for coupling through one of the apertures 42 and engaging the planar surface of the flexible program card 40. The longitudinal depth of the reduced diameter section 64 is approximately equal to the thickness of the flexible program card 40 as shown in FIG. 5. A command pin 60 may be inserted into one of the apertures 42 within one of the rows 44 for representing a specific command corresponding to the actuation or depression of one of the depressible keys 16a–dd of the calculator 10.

Figure 2:
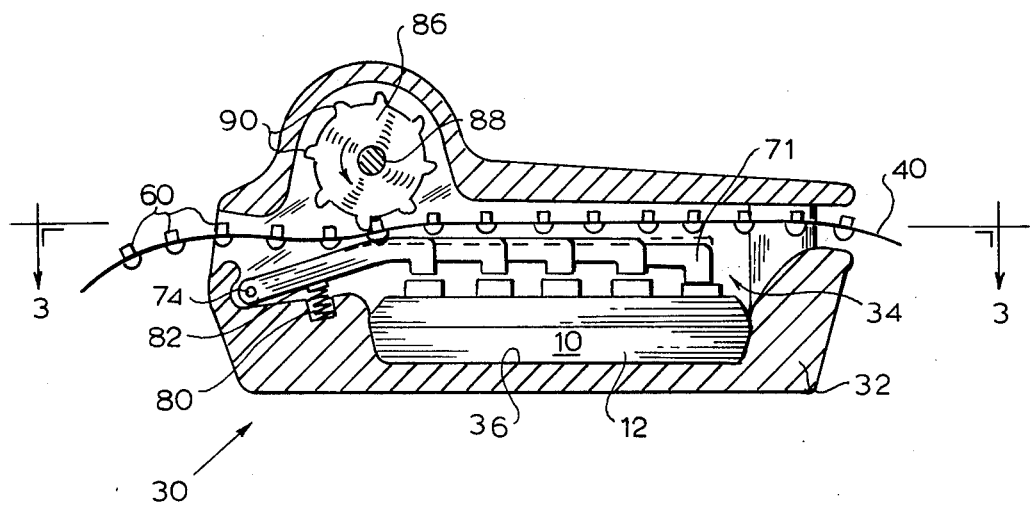
FIG. 2 is a frontal cross-section view taken along section lines 2—2 of FIG. 1.
Figure 3:
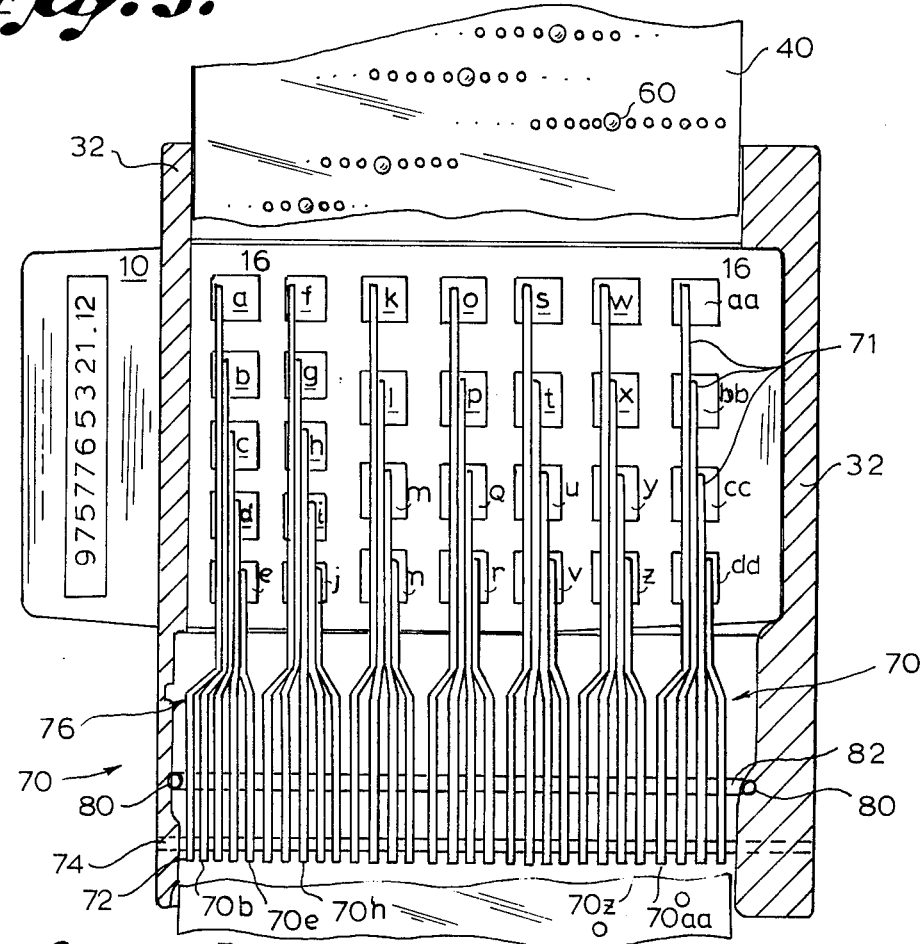
FIG. 3 is a top cross-sectional view taken along section lines 3—3 as shown in FIG. 2.

Actuator means are coupled between the flexible program card 40 and the depressible keys 16a–dd of the calculator for actuating the depressible keys responsive to the command pins 60 coupled to the flexible program card 40. In the first preferred embodiment of the present invention as illustrated in FIGS. 2, and 3, the actuator means comprises a plurality of levers 70a—dd pivotally coupled to the frame 32. Each of the levers 70 is paired with one of the depressible keys 16a–dd of the calculator 10. Each of the keys 16 is also paired with one of the columns 46 of the flexible program card 40. For purposes of clarity, individual ones of the levers will be denoted by the number 70 together with the letter designation of the depressible key 16a–dd corresponding thereto. That is, the first lever as viewed from the left margin of FIG. 3 will be 70a, the next lever will be 70b, etc.

Each of the levers 70 includes a first end 71 which is juxtaposed to the corresponding one of the depressible keys 16a-dd of the calculator 10. The first end 71 of the lever 70 is spaced from the keys 16a–dd, thereby providing a clearance for the calculator 10 to slide into the rectangular cavity 34 within the frame 32. This spacing also allows the first end 71 of the lever 70 to communicate with the corresponding depressible key 16a–dd without excessive dead space movement when actuated. A second end 72 of each lever 70 is movably coupled to a lever pivot axis 74 which is generally parallel to the rows 44 and perpendicular to the columns 46 of the flexible program card 40. Each of the levers 70 also includes thereon an actuating section, shown generally as 76, juxtaposed with and spaced from the apertures 42 in the corresponding column 46 of the flexible program card 40. The actuating sections 76 of the levers 70 form an actuating zone which is parallel to a juxtaposed one of the rows 44 of apertures 42 in flexible program card 40. If an aperture 42 within the flexible program card 40 contains a command pin 60, then only the enlarged head section 62 of the command pin 60 will communicate with the actuating section 76 of the lever 70 as that row 44 is juxtaposed with the actuating zone, as shown in FIG. 2.

Biasing means are provided between the levers 70 and the frame 32 for biasing the first end 71 of the levers out of actuating communication with the depressible keys 16a–dd of the calculator 10. As shown in FIGS. 2 and 4, the preferred embodiment of the biasing means comprises two compressed coiled springs 80, each coupled at one end thereof to the frame 32 and at another end thereof to a biasing bar 82 which is in communication with the lower surface of the levers 70.

Motive means are coupled to the frame 32 for moving the flexible program card 40, and the command pins 60 coupled thereto, relative to the actuator means for sequentially actuating the depressible keys 16a–dd of the calculator 10. In the preferred embodiment of the present invention as shown in FIG. 2, the motive means comprises a generally cylindrical cam 86 rotatably coupled about a shaft 88 to the frame 32. The shaft 88 is generally perpendicular to the columns 46 and generally parallel to the rows 44 on the flexible program card 40. A plurality of longitudinal ridges 90 are spaced circumferentially about the cylindrical cam 86. The longitudinal ridges 90 are generally parallel to the shaft 88, and to the rows 44 of the flexible program card 40. The longitudinal ridges 90 have a generally planar leading edge surface for engaging with the first end 61 of the command pins 60 communicating through the apertures 42 of the flexible program card 40. The height of the longitudinal ridges 90 is provided such that the circumferential surface of the cylindrical cam 86 communicates against the tapered first end 61 of the command pin 60, thereby forcing the enlarged head section 62 of the command pin 60 to communicate against the actuating section 76 of the corresponding lever 70, but only within the actuating zone. This communication displaces the actuating section 76, thereby causing a similar displacement of the first end 71 of the lever 70, thus actuating or depressing the corresponding one of the depressible keys 16a–dd of the calculator 10.

As the rotation of the cylindrical cam 80 continues about the shaft 88, a following one of the longitudinal ridges 90 engages a subsequent or following row 44 of command pins 60 coupled to the flexible program card 40, thereby sequentially propelling the rows 44 of the flexible program card 40 through the actuating zone and through communication with the actuating section 76 of the levers 70. Since the frame 32 includes internal guides for controlling the lateral motion of the flexible program card 40, the rotation of the cylindrical cam 86 will cause each step of the program to be sequentially loaded into the programmable calculator 10 as each of the rows 44 of command pins 60 are sequentially passed through the actuating zone and over the actuating sections 76 of the respective levers 70. A hand crank 94 is attached to the end of the shaft 88 for manually rotating the cylindrical cam 86. Of course, a controlled speed electrical motor could also be coupled to the shaft 88 for controlling the cylndrical cam 86. While a motive means which engages the command pins 60 has been illustrated, it is also considered to be within the scope and spirit of the invention that the motive means could directly engage the flexible program card 40 for controlling the motion thereof.

The operation of the programming apparatus 30 will now be described with reference to FIGS. 1, 2, 3 and 4. First, the flexible program card 40 is cleared of all previously used command pins 60. Next, the sequential steps of the program are each assigned sequential row numbers from the rows 44 of apertures 42 on the flexible program card 40. The function (or number) to be inserted at each program step is then determined and the proper column 46 corresponding to that function is located. At the intersection of the proper step, or row 44, and the proper function, or column 46, a command pin 60 is placed within the corresponding aperture 42. Each of the program steps is encoded onto the flexible program card 40 by similarly inserting command pins 60 into the appropriate apertures 42 for each of the program steps or rows 44.

Next, power is applied to the electronic calculator 10 and the previously stored memory or program steps erased therefrom. The electronic calculator 10 is then inserted into the rectangular cavity 34 of the frame 32, thereby providing proper registration between the depressible keys 16a–dd and the first ends 71 of the levers 70. Next, the first end of the flexible program card 40 is inserted into the rectangular opening adjacent to the cylindrical cam 86 within the frame 32. The operator then rotates the handle crank 94 causing the cylindrical cam 86 to rotate about the shaft 88. The longitudinal ridges 90 thereby sequentially engage, one row at a time, the command pins 60 within each of the rows 44. As each command pin 60 is transported through the actuating zone and over the actuating section 76 of its corresponding section 70, the length of the command pin 60 causes a deflection of the lever 70, thereby causing the first end 71 of the lever to actuate its corresponding depressible key 16a–dd of the electronic calculator 10. As the rotation of the cylindrical cam 86 continues, the command pin 60 passes from the actuating zone and out of communication with the actuating section 76 of the lever 70, thereby allowing the biasing springs 80 and the biasing bar 82 to return the first end 71 of the lever 70 to a non-actuating or rest position. As the operator continues to turn the handle crank 94, a following one of the longitudinal ridges 90 engages the next sequential row 44 on the flexible program card 40 repeating the step-by-step program loading process.

Of course, it will be obvious to one skilled in the art that more than one of the apertures 42 in each of the rows 44 may contain a command pin 60, depending upon the particular requirements of each of the electronic calculators. For example, some calculators could use double or triple function keys, where one key represents a number or alternately represents a function if a function key is simultaneously or preceedingly actuated. Therefore, command pins 60 placed in various apertures 42 within a row 44 can correspond either to numbers to be entered into the program, or to functions defining the program itself. Regardless of what the command pins 60 represent, they can easily be changed by merely pushing the pin from the aperture 42 and reinserting the pin in the desired aperture within the flexible program card 40. After the last step of the program has been entered, or the last row 44 containing a command pin 60 has been transported past the actuating section 76 of the levers 70, then the electronic calculator 10 may be removed from within the rectangular cavity 34 of the frame 32 so that the numerical variables may be inserted into the calculator as per normal operating procedures. The calculator may then be used in a normal fashion to yield the desired answers. In the same manner, the programming apparatus 30 may also be used with non-programmable type calculators to perform repititious steps required between the entry of the variables.

The preferred embodiment of the manual programming apparatus has been described as an example of the invention as claimed. However, the present invention should not be limited in its application to the details illustrated in the accompanying drawings and the specification, since this invention may be practiced or constructed in a variety of different embodiments. Also, it must be understood that the terminology and descriptions employed herein are used solely for the purpose of describing the general operation of the preferred embodiment and therefore should not be construed as limitations on the operabiity of the invention.

I claim:

1. An apparatus for programming a hand-held, electronic calculator of the type having depressible-key numerical and programming inputs, said programming apparatus comprising in combination:
   tape storage means having a matrix of rows and columns thereon;
   command means for coupling to said tape storage means at an intersection of one of said rows and said columns, thereby storing a particular programming command thereon;
   actuator means coupled between said tape storage means and said depressible keys of said calculator for actuating said depressible keys responsive to said command means;
   a frame for receiving therein said calculator and for providing registration between said tape storage means, said command means, said actuator means and said depressible keys; and
   motive means coupled to said frame for moving said tape storage means, and said command means coupled thereto, relative to said actuator means for sequentially actuating said depressible keys, whereby said electronic calculator is programmed.

2. The programming apparatus as described in claim 1 wherein said actuator means comprises a plurality of levers, with each of said levers being paired with one of said depressible keys and with one of said columns of said tape storage means.

3. The programming apparatus as described in claim 2 wherein each of said levers includes a first end juxtaposed with said paired one of said depressible keys, with an actuating section of said lever juxtaposed with said paired one of said columns of said tape storage means for being displaced into an actuating position when in communication with said command means, thereby depressing said paired one of said depressible keys.

4. The programming apparatus as described in claim 3 wherein said actuator means further comprises biasing means coupled to said levers for biasing said levers out of said actuating position.

5. The programming apparatus as described in claim 4 wherein each of said levers is movably coupled to said frame about a pivot spaced from said first end and from said actuating section.

6. The programming apparatus as described in claim 3 wherein said command means comprises a plurality of command pins, with each of said command pins for being removably coupled to one of a plurality of apertures in said tape storage means, with each of said apertures being located generally at an intersection of one of said rows and said columns on said tape storage means.

7. The programming apparatus as described in claim 6 wherein each of said command pins comprises a shaft, having first and second ends, and a recessed section intermediate said first and second ends for coupling with said aperture in said tape storage means.

8. The programming apparatus as described in claim 7 wherein said motive means comprises;
   cam means rotatably coupled about an axis generally parallel with said rows of said tape storage means;
   engaging means coupled to said cam means for engaging said command pins in one of said rows and moving said command pins through communication with said actuating section of said corresponding one of said levers, thereby actuating one of said depressible keys of said calculator; and
   means for rotating said cam means about said axis for sequentially engaging said command pins and moving each of said rows of said tape storage means in a direction parallel to said columns thereon.

9. The programming apparatus as described in claim 8 wherein said cam means comprises a cylinder and wherein said engaging means comprises a plurality of ridges spaced about a circumference of said cylinder, with said ridges being parallel to said rows for engaging said command pins therein.

10. The programming apparatus as described in claim 9 wherein said means for rotating said cam means comprises a manually operated hand crank.

11. The programming apparatus as described in claim 7 wherein said tape storage means comprises a flexible program card having a plurality of said apertures therein, whereby each of said columns is paired with one of said depressible keys of said calculator and each of said rows represents one step in the program.

12. An apparatus for programming a hand-held, programmable electronic calculator of the type having a plurality of depressible keys, said programming apparatus comprising in combination:
   a program card having a plurality of apertures therein forming a matrix defined by a plurality of rows and columns;
   a plurality of command pins, each for being restrained within a selected one of said apertures within one of said rows, thereby representing a programming command;
   a frame for receiving therein said calculator and for providing registration between said columns of said program card and said depressible keys of said calculator;
   a plurality of levers coupled to said frame, with each of said levers paired with and juxtaposed to one of said columns of said program card and juxtaposed to a corresponding one of said depressible keys of said calculator for actuating said paired one of said depressible keys responsive to the displacement of said lever by said command pin; and
   cam means rotatable about an axis generally perpendicular to said columns of said program card for engaging said command pins in one of said rows and moving said command pin in said program card through communication with said corresponding one of said levers, thereby sequentially actuating said depressible keys for programming said calculator.

* * * * *